United States Patent Office

3,660,404
Patented May 2, 1972

---

3,660,404
U.V.-ABSORBING ORTHO-HYDROXYPHENYL SUBSTITUTED BIPYRIMIDYLS
Jan-Eric A. Otterstedt, Simrishamn, Sweden, and Richard Pater, Wilmington, Del., assignors to E. I. du Pont de Nemours and Company, Wilmington, Del.
No Drawing. Filed Feb. 24, 1969, Ser. No. 801,842
Int. Cl. C07d 51/36
U.S. Cl. 260—256.4 R  7 Claims

---

ABSTRACT OF THE DISCLOSURE

Ultraviolet absorbing bipyrimidyls of the formula

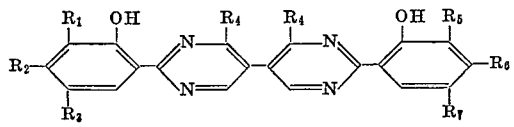

where $R_{1-3}$ and $R_{5-7}$ are selected from hydrogen, chlorine, hydroxy, alkyl, alkoxy and acyloxy, and $R_4$ is hydrogen; useful to protect photodegradation-prone substrates; and process for preparing same by condensing selected amidines with a tetraformylethane in a solvent containing an acid-binding agent.

---

Photodegradation-prone substrates containing the novel subject compounds in an amount sufficiet to substantially retard photodegration.

Processes for preparing the novel byprimidyls and bipyridyls by condensing an amidine or beta-aminocinnamonitrile with a tetraformylethane in a solvent containing an acid-binding agent; and for preparing the novel phenanthrolines by condensing a salicylaldehyde with a p-acylamidoaniline and pyruvic acid, deacylating and decarboxylating the resulting 4-carboxy-6-acylamidoquinoline, condensing the resulting aminoquinoline with antoher molecule of the salicylaldehyde and pyruvic acid, and decarboxylating the resulting phenanthroline carboxylic acid.

This invention concerns novel ultraviolet absorbing bis(hydroxyphenyl) compounds highly resistant to degradation of ultra-violet light and useful as light screens and photostabilizers.

Degradative effects of ultra-violet light on various materials are well known. The problem is especially acute with polymeric materials subject to exposure to sunlight for long periods of time, and the art has proposed to use various additives as ultra-violet screens or photostabilizers. One important photo-stabilizer class includes hydroxyaryl-substituted aromatic compounds wherein the hydroxyl hydrogen is H-bonded to an electron donating element of the conjugated system, such as carbonyl oxygen or imino-nitrogen. Such compounds in general are believed to function as ultra-violet screens by absorbing ultra-violet light, whereby they are raised to a higher energy state, internally converting the absorbed energy to relatively innocuous vibrational energy within the molecular framework, and transferring the converted energy to the surroundings as heat. Thus, by such radiationless process, the photoexcited molecule decays to its ground state where it again becomes available to absorb incident light and repeat the energy-dissipating process.

Many commercially available photostabilizers, including o-hydroxyaryl benzophenones and o-hydroxyaryl benzotriazoles, are not entirely satisfactory, particularly for longtime use, as they are somewhat limited in their ability to dissipate their absorbed light energy through radiationless decays. Accordingly, during each cycle some fraction of the photoexcited U.V.-absorber undergoes side reactions, either decomposing or attacking its surroundings, with the result that gradually on prolonged exposure the effective concentration of the U.V.-screen is depleted and the substrate deteriorates.

It is accordingly among the objects of the present invention to provide new ultra-violet absorbers with high inherent photostability, that is, that internally dissipate their absorbed light energy with high efficiency. Another object is to provide such photostabilizers readily adapted for use as ultra-violet screens in a wide variety of substrates. A still further object is to provide novel processes for the preparation of the subject compounds.

BRIEF SUMMARY OF THE INVENTION

These and other objectives are accomplished according to the present invention by:

(A) Novel compounds of the formula

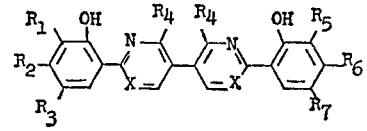

where

X=N, CH or C—CN, $R_4$=H when taken singly or —CH=CH— when taken together, and $R_1$ to $R_3$ and $R_5$ to $R_7$=H, Cl, OH, alkyl, alkoxy or acyloxy.

Preferred bipyrimidyls (where X=N and $R_4$=H) include 2,2' - bis(o - hydroxyphenyl) - 5,5' - bipyrimidyl and 2,2' - bis(o,p-dihydroxyphenyl) - 5,5' - bipyrimidyl. Preferred bipyridyls (X=CH and $R_4$=H) include 6,6'-bis(p-hydroxyphenyl) - 3,3' - bipyridyl and 6,6' - bis(o,p-dihydroxyphenyl)-3,3'-bipyridyl. Preferred phenanthrolines (X=CH and $R_4$ taken together is —CH=CH—) include 3,8-bis(o-hydroxy-phenyl)-4,7-phenanthroline and 3,8-bis (o,p-dihydroxyphenyl)-4,7-phenanthroline. Normally the alkyl, alkoxy and acyloxy are essentially aliphatic groups containing from 1 to about 18 carbons, as exemplified hereinafter, but they may also represent larger groups such as polymeric residues, as these do not change the essential photostable character of the defined ring systems;

(B) Photodegradation - prone substrates, especially polymeric substrates, photostabilized by incorporation of the subject compounds;

(C) Novel processes for preparing bipyrimidyls and bipyridyls including condensing an amidine or beta-aminocinnamonitrile of the formula

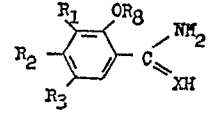

where $R_1$ to $R_3$ are as defined above, $R_8$=H or an inert blocking group, and X=N or C—CN, with a tetraformylethane derivative of the formula

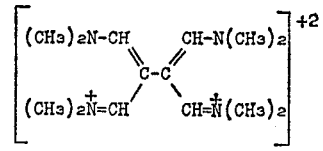

in a solvent containing an acid-binding agent in an amount providing at least about one hydrogen ion equivalent of acid-binding agent per molecule of the amidine or beta-aminocinnamonitrile employed taken as the free base. The amidine is usually in the form of a salt of a mineral acid, preferably an amidinium sulfate; and (D) A novel process for preparing phenanthrolines including the steps of condensing a salicylaldehyde of the formula

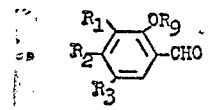

where $R_1$ to $R_3$ are as defined above and
$R_9$ = H or lower alkyl, with a p-acylamidoaniline and pyruvic acid, deacylating and decarboxylating the resulting 2-(o-hydroxy- or o-alkoxyphenyl) - 4 - carboxy - 6 - acylaminoquinoline, condensing the resulting 2-(o-hydroxy- or o-alkoxyphenyl)-6-aminoquinoline compound with another molecule of the salicylaldehyde and pyruvic acid, and decarboxylating the resulting 3,8 - bis(o-hydroxy- or o-alkoxyphenyl) - 4,7-phenanthroline-1- carboxylic acid. Where $R_9$ is a lower alkyl, an additional dealkylating step may be employed to convert the o-alkoxyphenyl rings to o-hydroxyphenyl.

Other preferred embodiments are discussed in more detail hereinafter.

DETAILED DESCRIPTION OF INVENTION

Bases for the invention

This invention is based on the discovery that the bis(o-hydroxyphenyl)bipyrimidyls, bipyridyls and phenanthrolines wherein the o-hydroxyphenyl groups are positioned such that the phenolic hydrogens can internally hydrogen-bond to the aromatic nitrogen atoms of the heterocyclic ring systems have high extinction coefficients in the near ultraviolet, are remarkably stable to such ultraviolet light, and thus have high inherent utility as U.V.-screens. The o-hydroxyphenyl moieties may be variedly substituted, as defined, without adversely affecting the inherent photostability. Thus, introducing appropriate substituents (to modify such optical properties as the extinction coefficient and specific absorptivity and such physical properties as solubility in and compatibility with polar and non-polar substances) affords a wide variety of derivatives readily adapted for use in a wide variety of substrates as U.V.-screens and photostabilizers.

Without limiting the invention to a particular interpretation, it is considered that photostability in general is determined by how rapidly and efficiently photoexcited U.V.-absorbing molecules return to their ground states before they decompose or react with their surroundings. The high photostability of the invention compounds may be explained with reference to the normal ground imino-enol State I, its somewhat higher energy amino-keto

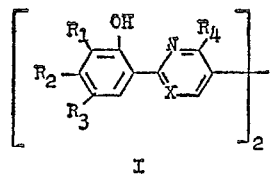

tautomeric form II, and the corresponding excited states, I* and II*. States I and II may be illustrated as:

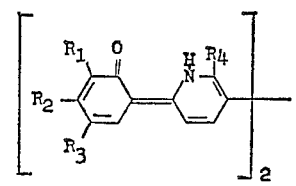

States I* and II* can only be described speculatively, but are considered in theory to differ from I and II in having electrons in higher (less stable) energy levels.

In this scheme, which is summarized in Equations 1–4 below.

(1) $I \xrightarrow{UV\text{-light}} I^*$ (2) $I^* \longrightarrow II^*$ (3) $II^* \longrightarrow II$ + heat (4) $II \longrightarrow I$ + heat, photo-excited I* dissipates its absorbed energy essentially through conversion to II*, involving energy-absorbing-electron bond shifts and atom movements accompanying such shifts, as well as through the usual bond vibrations spreading energy over the entire molecular framework. II* evidently corresponds to a relatively low-energy activated state which readily decays vibrationally with heat loss, to its ground state which reverts to I, by simple hydrogen and electron shifts, also with heat loss to the surrounding substrate molecules.

The high photostability of the invention compounds is attributable both to the strategically positioned o-hydroxyaryl groups and to the fact that the heteroaryl rings are coupled in a bi-aryl relationship with the coupling bond para to the hydroxyphenyl groups.

Preparation

Bipyrimidyls and bipyridyls of this invention are conveniently obtained by condensing an appropriately substituted amidine or a beta-aminocinnamonitrile with tetraformyl ethane or precursors thereof, such as (for ease of handling) a mineral acid salt of the amidine or aminonitrile component, and 1,4-bis(dimethylamino)-2,3-bis(dimethyliminiummethyl)-1,3-butadiene (preferably in association with perchlorate ion or other salt-forming anion).

A preferred process is illustrated by the equation

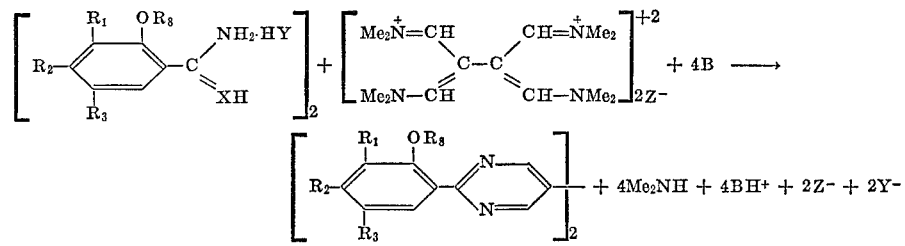

where X and $R_1$ to $R_3$ are as defined above; $R_8$ stands for hydrogen or a readily removable blocking group such as alkyl, allyl or benzyl; HY is HCl, $H_2SO_4$, $H_3PO_4$ or other mineral acid; Z is a salt-forming anion such as $Cl^-$, $SO_4^=$ or $ClO_4^=$; and B is an acid binding agent such as NaOH, $NaOC_2H_5$, $K_2CO_3$, $Ca(OH)_2$ or other available alkali metal, alkaline earth metal, hydroxide, carbonate or alkoxide. The acid-binding agent should be present in an amount providing at least one (and preferably at least two) hydrogen ion equivalent of acid-binding agent per molecule of amidine or beta-aminocinnamonitrile employed taken as the free base.

The condensation is normally run in aqueous or alcoholic media (e.g., ethanol) at 25–100° C., but other media may be used wherein the reactants are soluble and preferably the bipyrimidyl or bipyridyl is insoluble for ready recovery. The bipyrimidyl or bipyridyl products, normally solids, may be recovered from the reaction mass and purified, if necessary, by conventional means including solvent extraction, crystallization from solvents and sublimation, as more particularly illustrated in the examples. With amidines (X=N) as reactants $OR_8$ is normally OH, and bipyrimidyls with the desired bis(o-hydroxyphenyl) moieties are obtained directly in the above method. The amidines are available from the corresponding amides via the iminochlorides or iminoethers by reaction with ammonia according to known methods. One advantageous method discovered herein involves reacting the iminoether hydrochloride derivative of the amide with ammonium carbonate as illustrated in the examples.

Representative o-hydroxy-benzamidines include o-hydroxybenzamidine,
2,4-dihydroxybenzamidine,
2-hydroxy-4-methoxybenzamidine,
2-hydroxy-4-butoxybenzamidine,
2-hydroxy-4,5-dimethoxybenzamidine,
2-hydroxy-5-methylbenzamidine,
2-hydroxy-5-tert-butylbenzamidine,
2-hydroxy-5-chlorobenzamidine, and
2-hydroxy-3,5-dichlorobenzamidine.

Mixtures of such benzamidines may be employed, if desired to produce mixtures of the corresponding bipyrimidyls.

Typical 5,5'-bipyrimidyls of this invention that may be prepared by the above method are 2,2'-bis(o-hydroxyphenyl)-;
2,2'-bis(o-p-dihydroxyphenyl)-;
2,2'-bis(o,p-dihydroxyphenyl)-;
2,2'-bis(o-hydroxy-p-methoxyphenyl)-;
2,2'-bis(2-hydroxy-4,5-dimethoxyphenyl)-;
2,2'-bis(2-hydroxy-5-methylphenyl)-;
2,2'-bis(2-hydroxy-5-tert.butylphenyl)-;
2,2'-bis(2-hydroxy-5-chlorophenyl)-;
2,2'-bis(2-hydroxy-3,5-dichlorophenyl)-;
2-(o-hydroxyphenyl)-2'-(o-hydroxy-p-methoxyphenyl)-; and
2-(2-hydroxy-5-methylphenyl)-2'-(2-hydroxy-4-ethoxyphenyl)-5,5'-bipyrimidyl.

Beta-aminocinnamonitriles useful in the process scheme of this invention are conveniently prepared by condensing appropriately substituted o-hydroxy benzonitriles with acetonitrile in the presence of sodium hydride in tetrahydrofuran. The o-hydroxy group of the benzonitrile is suitably blocked from reaction with sodium hydride by first alkylating with methyl, allyl, benzyl or the like inert and readily removable groups according to well-known methods. Typical beta-aminocinnamonitriles include in addition to the o-methoxy derivative the following: 2-methoxy-4-methyl-; 2-methoxy-4,5-dimethyl-; 2-methoxy-5-butyl-; 2-methoxy-5-chloro-; 2-methoxy-3,5-dichloro-; 2,4-dimethoxy-; 2-allyloxy-5-amyloxy-; and 2,4,5-trimethoxy-beta-aminocinnamonitrile. Mixtures of beta-aminocinnamonitrile may be used.

The bipyridyls first formed according to the above scheme,

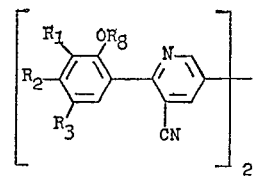

may be converted to the desired photostable structure by removing the blocking groups, hydrolyzing the cyano groups at the 5,5'-position to produce the dicarboxylic acid, and then decarboxylating, e.g. by heating with copper in quinoline.

Dealkylating the O-alkylated oxygroups may be effected by methods known to the art for cleaving alkyl aryl ethers, e.g. by heating with concentrated hydrobromic acid. Alkoxy groups present at other ring positions may also be cleaved under these conditions. Thus bis(polyhydroxyphenyl) pyridyls can be prepared starting from polyalkoxybenzonitriles. On the other hand, when o-hydroxyalkoxy substituted bipyridyl are desired, i.e. where one or more of the $R_1$ to $R_3$ groups are alkoxy the hydroxyls at these positions can be selectively alkylated as described below. Representative 3,3'-bipyridyls that may be prepared by the above reaction scheme include the parent 6,6'-bis(o-hydroxyphenyl)- derivative and the following further substituted derivatives thereof:

6,6'-bis(2,4-dihydroxyphenyl)-;
6,6'-bis(2,4,5-trihydroxyphenyl)-;
6,6'-bis(2-hydroxy-4-methylphenyl)-;
6,6'-bis(2-hydroxy-4,5-dimethylphenyl)-;
6,6'-bis(2-hydroxy-5-butylphenyl)-;
6,6'-bis(2-hydroxy-5-chlorophenyl)-;
6,6'-bis(2-hydroxy-3,5-dichlorophenyl)-;
6-(o-hydroxyphenyl)-6'-(o,p-dihydroxyphenyl)-;
6-(2-hydroxy-4-methylphenyl)-6'-(2-hydroxy-5-chlorophenyl)-3,3'-bipyridyl; and the corresponding bipyridyl bearing cyano-groups at the 5 and 5'-positions.

3,8-bis(o-hydroxyphenyl)-4,7-phenanthrolines of this invention can be prepared using a double Doebner pyruvic acid synthesis, preferably applied stepwise. This involves (1) condensing an appropriately substituted salicylaldehyde or o-alkoxybenzaldehyde, pyruvic acid and p-acylamidoaniline (preferably p-acetamidoaniline) to yield a 2-(o-hydroxy- or o-alkoxyaryl)-4-carboxy-6-acylamidoquinoline, e.g.,

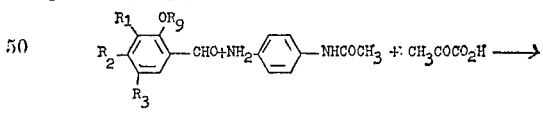

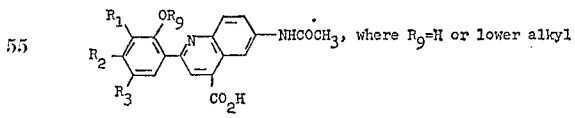

(2) saponifying to deacylate the blocked amino group, (3) decarboxylating, e.g. by heating with copper in quinoline, (4) repeating the Doebner reaction on the aminoquinoline with the same or a different substituted benzaldehyde to yield

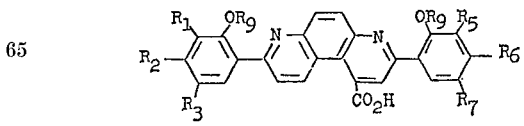

which is (5) decarboxylated as before and (6) dealkylated e.g. by heating with conc. hydrobromic acid. When $R_{1-3}$ and $R_{5-7}$ include alkoxy groups, these may also be cleaved by the HBr treatment. This can be advantageous, for the resulting compounds wherein one or more of $R_{1-3}$ and $R_{5-7}$ are hydroxyl and can be further reacted with alkylating or acylating agents to introduce desired alkyl groups and acyl groups as disclosed below. Typical substituted benzaldehydes that may be used to prepare photostable phenanthrolines of this invention include 2-methoxy-; 2-methoxy-4-methyl-; 2-methoxy-4,5-dimethyl-; 2-methoxy-5-butyl-; 2-methoxy-5-chloro-; 2-methoxy-5-dichloro-; 2,4-dimethoxy-; 2,4,5-trimethoxybenzaldehyde; and mixtures thereof. Thus this method affords the following representative 4,7-phenanthrolines:

3,8-bis(o-hydroxyphenyl)-;
3,8-bis(o,p-dihydroxyphenyl)-;
3,8-bis(2,4,5-trihydroxyphenyl)-;
3,8-bis(2-hydroxy-4-methylphenyl)-;
3,8-bis(2-hydroxy-4,5-dimethylphenyl)-;
3,8-bis(2-hydroxy-5-butylphenyl)-;
3,8-bis(2-hydroxy-5-chlorophenyl)-;
3,8-bis(2-hydroxy-3,5-dichlorophenyl)-;
3-(o-hydroxyphenyl)-8-(o,p-dihydroxyphenyl)-; and
3-(2-hydroxy-4-methylphenyl)-8-(2-hydroxy-5-chlorophenyl)-4,7-phenanthroline.

Still other bipyrimidyls, bipyridyls and phenanthrolines that may be prepared by the above methods will occur to those skilled in the art. The amidines, beta-aminocinnamonitriles and aldehydes required to produce any particular bipyridyl, bipyrimidyl or phenanthroline desired are readily identified by inspection of those structures.

Bipyrimidyls, bipyridyls and phenanthrolines of this invention may also be prepared by condensing 2,2'-dichloro-5,5'-bipyrimidyl, 6,6'-dichloro-3,3'-bipyridyl, or 3,8-dichloro-4,7-phenanthroline with 2 molar proportions of a hydroxyarene which is unsubstituted at a position ortho to the hydroxy group and preferably is substituted at the position para to the hydroxy group, such as phenol, p-methylphenol, p-butylphenol, 3,4-dimethylphenol, p-nonylphenol, p-methoxyphenol, p-butoxyphenol, 1,3-dihydroxybenzene (resorcinol), 1,4-hydroquinone, 1,3,4-trihydroxybenzene or mixtures thereof in the presence of about 2 to 3 molar proportions aluminum chloride, conveniently in o-dichlorobenzene, nitrobenzene or other suitable Friedel-Crafts reaction solvent at temperatures ranging from about 75 to 190° C. Typical compounds that may thus be prepared are 2,2'-bis(o-hydroxy-5-methylphenyl)-5,5'-bipyrimidyl; 2,2'-bis(o,p-dihydroxyphenyl) bipyrimidyl; 6,6'-bis(o,p-dihydroxyphenyl)-3,3'-bipyridyl; and 3,8-bis-(o,p-dihydroxyphenyl)-4,7-phenanthroline.

Bis(o - hydroxyphenyl)bipyrimidyls, bipyridyls, and phenanthrolines prepared by any of the above or other methods that bear substitutents among $R_{1-3}$ to $R_{5-7}$ that are chemically reactive such as hydroxy groups can be subsequently treated, for example by well known alkylation and acylation techniques to provide derivatives also valuable as U.V.-screens.

This method is based on the discovery that the o-hydroxy group of the phenyl ring (critical for photostability) is far less reactive towards alkylation and acylation than other hydroxy groups when present on such phenyl, evidently because the o-hydroxy group is strongly hydrogen-bonded to the heterocyclic ring nitrogen. Thus, through control of molar proportions and other reaction conditions, as will be appreciated by those skilled in the art, it is possible to selectively alkylate and acylate the other groups, substantially without affecting the o-hydroxy group. When isomeric structures are possible, physical methods help to identify and characterize the desired structures with the hydroxy group in the desired hydrogen-bonding ortho-position. For example with reference to the nuclear magnetic spectra of these compounds the internally hydrogen-bonded o-hydroxy groups show proton signals farther downfield than hydroxy groups at other positions relative to a standard's proton signal such as that of tetramethylsilane in deuterochloroform.

The terms alkylating and acylating agents are used in the generic sense. Included are diazomethane, methyl diazoacetate, methylbromide, octadecyl bromide, β-chloroethanol, ethylene oxide, methyl bromoacetate, ethyl bromoacetate, dimethyl sulfate, allyl chloride, methallyl chloride, benzyl chloride, 1,2-propyleneoxide, 3-iodopropanol, 4-chloro-2-butenol, propiolactone, acetyl chloride, acrylyl chloride, methacrylyl chloride and the like. Thus for example there may be prepared from the bis(o,p-hydroxyphenyl) compounds such further useful photostable derivatives of this invention as 2,2'-bis(2-hydroxy-4-methoxyphenyl)-5,5'-bipyrimidyl;
2,2'-bis(2-hydroxy-4-octadecyloxyphenyl)-5,5'-bipyrimidyl;
2,2'-bis(2-hydroxy-4-beta-hydroxyethyloxyphenyl)-5,5'-bipyrimidyl;
2,2'-bis(2-hydroxy-4-acrylyloxyphenyl)-5,5'-bipyrimidyl;

and the like 6,6'-disubstituted 3,3'-bipyridyls and 3,8'-disubstituted-4,7-phenanthrolines.

Utility

As stated above, the hydroxyaryl compounds of this invention are U.V.-absorbers that rapidly and efficiently dissipate such normally destructive energy through non-degradative processes. They are thus useful as light screens and photostabilizers in or on liquid or solid organic materials normally prone to deteriorate in unfiltered sunlight or other light containing U.V. components. One important substrate class includes resinous and polymeric materials including elastomers which may be natural or synthetic, as films, sheets, fibers, textiles or other forms presenting a surface subject to light exposure, in particular cellulosics such as cellulose acetate and cellophane, condensation polymers such as polyamides (nylon type), polyacetals (polyvinyl butyral resins), polyesters (e.g., ethylene terephthalate polyester film), and polyurethanes and addition polymers and co-polymers of ethylene, propylene, butadiene, chloroprene, styrene, acrylonitrile, vinyl chloride, vinyl fluoride, vinylidene chloride, vinylidene fluoride, alkyl acrylate, alkyl methacrylate and mixtures thereof.

The U.V.-sensitive materials to be protected may be contained within or located under U.V.-transparent materials, which themselves may or may not be prone to photodegradation. For example, dyes and pigments in polyolefins, polyacrylates and polyacetals, may thus be protected by incorporating therewith said hydroxyaryl compounds. Similarly the lightfastness of dyes and pigments which have been melt-incorporated into or applied on fibers, e.g. polyamides, can also be improved in this way. The hydroxyaryl compounds may likewise be melt-incorporated into the fiber during its manufacture or co-applied with dye in the textile finishing mill dyeing step.

Light-sensitive commodities like cosmetics or foods, e.g. milk, beer, potato chips, luncheon meats, bacon and other meats, dried fruits, frozen peas, beans and other vegetables, may be protected against discoloration, vitamin deterioration and light-catalyzed oxidative degradations by packaging these products in film packaging materials, e.g. polyolefins and cellophanes, containing the hydroxyaryl compounds either as part of the film composition or coated thereon to screen out the harmful rays.

Outdoor paints, coatings or other surfaces may also be protected against photodegradation by incorporating therewith or overcoating with films or other coatings containing light screeners of this invention. Thus pigmented building sidings coated wtih protective polyvinyl fluoride films containing light screeners of this invention are exceptionally stable to weathering and the effects of light. The light screeners may also be used in clear wood coatings, such as oil modified polyurethane, tung-oil phenolic spar varnish, exterior alkyds and nitro-cellulose coatings, to protect both the coating and the wood from darkening and deteriorating.

Adhesives and other bonding agents used in outdoor applications and prone to light degradation (for example acrylic, epoxy and polyester adhesive resins described and referred to by Tocker, U.S. Pat. No. 3,265,760), can likewise be protected by the U.V. screeners of this invention.

The hydroxyaryl compounds of this invention may also be incorporated as U.V. screens in acrylic coating compositions, particularly useful as automotive lacquers. Desirable coating compositions are more fully described by W. S. Zimmt, South African appln. 6,957/67 and British Pat. 1,124,690, which disclosure is incorporated herein by reference.

They are also useful as intermediates for the preparation of still further substituted hydroxyaryl-bipyrimidyls, bipyridyls and phenanthrolines useful as stabilizers. For example those compounds described above containing ethylenically unsaturated, polymerizable groups, may be converted to polymers wherein the photostabilizer moiety is appended to the main polymer chain.

The concentration of the photostabilizer in the substrate will normally vary with the particular stabilizer and its effectiveness, the substrate to be protected and its susceptibility to photodegradation and the effect desired. It is usually desirable to employ sufficient of the stabilizer to screen substantially all the potentially harmful radiation. In general, concentrations providing optical densities of from 1 to 2 correspond to 90% or more absorption of the incident light. Typical amounts for screening 90% or more of the light are from .05 to 5% by weight based on the substrate. Greater amounts, e.g. up to 20% by weight may be used if desired although such large amounts are generally unnecessary.

The hydroxyaryl compounds may also be advantageously employed with other additives normally employed to protect the various particular substrates described above against oxidative, thermal and other degradative processes. Included among such co-additives are phenolic antioxidants, salicylate thermal stabilizers, triaryl phosphoramides, nickel alkyl carbamates, nickel phenolates and dilauryl thiodipropionate. They may also be used with pigments, filters, plasticizers and other light absorbers if desired as long as these additives do not detract from their effectiveness for the purposes of this invention.

The following examples illustrate the invention. Temperatures are in degrees centigrade and quantities are in parts by weight unless otherwise noted. The structure of the compounds obtained in the described procedures were confirmed by elemental analyses.

PREPARATION EXAMPLES

Example 1

2,2'-bis(o-hydroxyphenyl) - 5,5' - bipyrimidyl: Ethyl o-hydroxybenziminoate hydrochloride (9.87 parts, 0.049 mole), absolute ethanol (35 parts) and ammonium carbonate mono-hydrate (14 parts, 0.123 mole) are mixed and agitated in a closed vessel for 72 hours at about 25° C. The vessel is vented to release $CO_2$. Its contents are filtered and the filtrate is evaporated at reduced pressures to remove the alcohol. Water (60 parts) and silver sulfate (14 parts) are added, the mixture is heated to boiling and filtered. o-Hydroxy benzamidinium sulfate crystallizes from the filtrate on cooling.

1,4-bis(dimethylamino) - 2,3 - bis(dimethyliminium-methyl)-1,3-butadiene perchlorate (10.4 parts, .023 mole, prepared essentially as described by Z. Arnold, Coll. Czech. Chem. Comm. 27, 2993 (1962)) is added to ethanolic sodium ethoxide obtained from 1.15 parts (.05 mole) Na and 55 parts absolute ethanol. The mixture is heated under reflux for 35 minutes and o-hydroxybenzamidinium sulfate (8.33 parts, .045 mole) is added, whereupon a yellow solid begins to precipitate. After 12 minutes sodium ethoxide (from 1.06 parts, 0.046 mole Na) in ethanol (27 parts) is added, and heating of the mixture is continued for 40 minutes. The reaction mixture is filtered hot to collect the pale yellow solid bipyrimidyl. This is further purified by washing with ethanol, slurrying in 70° water, subliming at .25 mm. Hg pressure and 280–300° C., slurrying in boiling acetic acid, filtering and drying, M.P. (melting point) 313–315°.

This compound shows the following U.V. absorption maxima (with extinction coefficients in parenthesis) when measured in 1:12 N,N-dimethylformamide:acetonitrile; 2950 A. (30,400); 3510 A. (36,800).

Example 2

6,6' - bis(o-hydroxyphenyl) - 3,3' - bipyridyl: Sodium (4.2 parts, 0.21 mole) is dissolved in absolute ethanol (360 parts). Dry dimethyl sulfoxide (100 parts) and 1,4-bis(dimethylamino) - 2,3 - bis(dimethyliminium-methyl)-1,3-butadiene perchlorate (40.6 parts, 0.09 mole) are added and the mixture is held at reflux for 20 minutes. Then a solution of o-methoxy-beta-aminocinnamonitrile in ethanol (360 parts) is added dropwise during 1.5 hours to the refluxing solution, and heating is continued for 1.75 hours more. The reaction mixture is cooled to about 0° and filtered. The filter cake is washed with cold ethanol, slurried in hot water, and refiltered.

The above 6,6' - bis(o-methoxyphenyl)-5,5'-dicyano-3,3' - bipyridyl (3.44 parts, M.P. 279–281°) is heated with NaOH (14 parts), water (50 parts) and ethanol (80 parts) in a stainless steel autoclave at 160° C. for 5 hours. The resulting substantially clear solution is filtered at about 25° to remove trace solids and acidified to pH 4 with hydrochloric acid to precipitate 6,6'-bis(o-methoxyphenyl) - 3,3' - bipyridyl - 5,5' - dicarboxylic acid, M.P. 290–291°.

The dicarboxylic acid obtained as above (2.72 parts), copper powder 2.72 parts and quinoline 65 parts are heated at 220–230° C. for 4 hours, then at 230–235° for 2 hours in a dry $N_2$ atmosphere. The quinoline is then distilled off under reduced pressure, the residue extracted with hot benzene and the extract filtered. Concentrating the filtrate, adding cyclohexane, cooling at 5° C. to crystallize the product, slurrying in boiling 4% by wt. NaOH (to solubilize any remaining carboxyl-containing material), and filtering yields 6,6'-bis(o-methoxyphenyl)-3,3'-bipyridyl.

This product (1.56 parts) is heated in 48% hydrobromic acid (50 parts) at reflux for 4 hours. The mixture is filtered at 25°, the filter cake slurried in water, filtered and dried, M.P. 304–308°. Sublimed at .02 mm. Hg and 250–300° and recrystallized from dimethylformamide, the thus purified 6,6'-bis(o-hydroxyphenyl)-3,3'-bipyridyl melts at 311–313°.

This compound shows the following U.V. absorption maxima (with extinction coefficients in parentheses) when measured in 3:37 N,N-dimethylformamide:acetonitrile: 3010 A. (21,300); 3840 A. (41,700).

The o-methoxy-beta-aminocinnamonitrile employed above is prepared as follows: Acetic anhydride (83 parts) is added to formic acid (1500 parts) containing about 1% water and the mixture is heated at boiling under reflux for 20 minutes. To the somewhat cooled solution are added o-methoxybenzaldehyde (136.2 parts), hydroxylamine hydrochloride (79.9 parts), and sodium formate (125.8 parts). The mixture is refluxed 2 hrs., cooled to room temperature and poured over a mixture of ice and water. The oil is extracted with diethyl ether; the ether layer is dried with calcium chloride, filtered, and evaporated. The residual oil is distilled at normal pressure to give o-methoxybenzonitrile boiling at 254–6°.

o-Methoxybenzonitrile (68.6 parts), acetonitrile (42.6 parts), and sodium hydride (as 42.0 parts of a 59% mineral-oil dispersion), and dry (dried over sodium) tetrahydrofuran (445 parts), are mixed under $N_2$ and heated in $N_2$ atmosphere at reflux under agitation for 6 hrs. Unreacted sodium hydride is filtered off while the mixture is still hot and washed with THF. The filtrate is concentrated to a thick syrup and triturated in ethyl ether. The resulting crystalline material is filtered off and crystallized from an ethyl acetate-petroleum ether mixture to give o-methoxy-beta-aminocinnamonitrile, M.P. 137–8.5°.

Example 3

3,8 - bis(o-hydroxyphenyl) - 4,7 - phenanthroline: o-methoxybenzaldehyde (45.3 g., 0.332 mole), pyruvic acid (30.0 g., 0.34 mole), and p-aminoacetanilide (50 g., 0.333 mole) are refluxed in absolute ethanol (500 ml.) for 2 hrs. The product is filtered, washed with ethanol, slurried in fresh, warm ethanol with stirring, filtered again, washed and dried in vacuo to give 2-(o-methoxyphenyl)-6 - acetaminoquinoline - 4 - carboxylic acid, melting at 263°–5° C. with gas evolution.

2-(o-methoxyphenyl) - 6 - acetaminoquinoline - 4-carboxylic acid (70.7 g. 0.21 mole), is saponified in 700 ml. of water containing 70 g. of sodium hydroxide at 80° C. for 2 hrs. The solution is decolorized with charcoal, filtered and acidified with conc. hydrochloric acid. The precipitated 2 - (o-methoxyphenyl)-6-aminoquinoline-4-carboxylic acid is filtered, washed with water, dried in vacuo, M.P. 237–8° C.

The above carboxylic acid (5 g.) is mixed intimately with copper powder (5 g.) and the mixture placed in the well of a sublimation apparatus immersed in an oil bath heated at 250° C. Decarboxylation is effected at a pressure of 40 mm. Hg for 30 min. followed by a rapid sublimation of the decarboxylated material at a pressure of about 0.25 mm. Hg and subsequent heating for an additional 2 hrs. The sublimed product is heated in 30 ml. of boiling ethanol, the mixture is filtred and 2-(o-methoxyphenyl)-6-aminoquinoline is allowed to crystallize from the filtrate. Recrystallized from ethanol (1.25 g. from 15 ml.) it melts at 123–7° C.

2 - (o-methoxyphenyl)-6-aminoquinoline (18.5 g.), o-methoxybenzaldehyde (10 g.) and pyruvic acid (7 g.) are heated in 500 ml. of refluxing absolute ethanol for 18 hrs. The hot reaction mixture is filtered and the recovered 3,8 - bis(o-methoxyphenyl)-4,7-phenanthroline-1-carboxylic acid is washed with boiling ethanol. It is further purified by dissolving in 100 ml. of 5% aq. sodium hydroxide solution with heating, filtering the solution, and precipitating the carboxylic acid with dilute aq. hydrochloric acid. The product is filtered, washed with water, and dried in vacuo to give 4.51 g., M.P. 278° C. with gas evolution.

The above 3,8 - bis(o-methoxyphenyl)-4,7-phenanthroline-1-carboxylic acid, 4.0 g. is decarboxylated by heating with copper powder (6.0 g.) in quinoline (140 ml.) at 230° C. under dry nitrogen for 3½ hrs. The hot reaction mixture is filtered to remove copper and the quinoline is distilled under reduced pressure. The residue is crystallized from benzene to yield, 3,8-bis(o-methoxyphenyl)-4,7-phenanthroline, melting at 239–241° C.

3,8-bis(o-methoxyphenyl)-4,7-phenanthroline described above is demethylated in 48% aq. hydrobromic acid in a sealed tube heated in an oil bath at 200° C. for 5½ hrs. After cooling and opening the tube, the precipitate is filtered and washed with aq. hydrobromic acid and then with water. The cake is slurried in 5% aq. sodium hydroxide solution which is heated to boiling with stirring. The insoluble product is filtered, washed with 5% aq. sodium hydroxide solution and water and dried in vacuo. It is then extracted with a large quantity of boiling acetic acid. The insoluble portion is sublimed in vacuo (0.025 mm. Hg) at 350° C. The sublimate is crystallized from dimethylformamide twice (0.75 g. of the sublimate is dissolved in 500 ml. of dimethylformamide at 110° C. and allowed to crystallize on cooling) to give 0.55 g. of purified 3,8-bis(o-hydroxyphenyl)-4,7-phenanthroline, a yellow compound melting sharply at 383° C. The material is dried in vacuo at 110° C.

This compound shows U.V. absorption maxima (with extinction coefficients in parentheses) as follows when measured in 1:8 N,N - dimethylformamide:acetonitrile mixture: 3070 A. (20,000); 3450 A. (31,000); 3650 A. (31,000).

Examples 4 to 7

Example 1 is repeated with substituted benzamidinium sulfates to obtain bipyrimidyls as tabulated below:

| Example | Benzamidinium sulfate | 5,5'-bipyrimidyl |
| --- | --- | --- |
| 4 | o,p-Dihydroxy | 2,2'-bis(o,p-dihydroxyphenyl). |
| 5 | 2-hydroxy-4-methyl | 2,2'-bis(2-hydroxy-4-methylphenyl). |
| 6 | 2-hydroxy-5-chloro | 2,2'-bis(2-hydroxy-5-chlorophenyl). |
| 7 | o-Hydroxy-p-methoxy | 2,2'-bis(o-hydroxy-p-methoxyphenyl). |

Example 8

2,2'-bis(o-hydroxy-p-propoxyphenyl) - 5,5' -bipyrimidyl: 2,2' - bis(o,p - dihydroxyphenyl) - 5,5' - bipyrimidyl (1.9 g., 0.005 mole), p-propyl bromide (1.30 g., 0.011 mole), and soda ash (1.08 g., 0.011 mole) in methyl Cellosolve (15 ml.) are heated with stirring at 100–110° C. for 3 hours. The methyl Cellosolve is removed by distillation under reduced pressure, and the product is slurried in water adjusted to pH 9 with NaOH, filtered, washed with pH 9 water, then with water until the washings are neutral.

Example 9

2,2'-bis(o-hydroxy - p - octyloxyphenyl)-5,5'-bipyrimidyl: 2,2' - bis(o,p - dihydroxyphenyl)-5,5'-bipyrimidyl (3.74 g., 0.01 mole), n-octyl bromide (4.10 g., 0.021 mole) and methyl Cellosolve (60 ml.) are heated with stirring under $N_2$ at 110–112° while a solution of 1.30 g. (0.023 mole) of potassium hydroxide in 40 ml. of methyl Cellosolve is added dropwise during 2 hours. The reaction mixture is stirred for 5 more hours at 110–112°, cooled to room temperature and distilled at reduced pressure to remove the solvent. The residue is washed with water, extracted with 5% aq. NaOH, again washed with water and dried.

By replacing n-octyl bromide with n-dodecyl bromide or n-octadecyl bromide in the above procedure, there are obtained 2,2'-bis(o-hydroxy - p - dodecyloxyphenyl)-5,5'-bipyrimidyl and 2,2'-bis(o-hydroxy - p - octadecyloxyphenyl)-5,5'-bipyrimidyl, respectively.

Example 10

2,2'-bis(o-hydroxy - p - acetoxyphenyl)-5,5'-bipyrimidyl: 2,2' - bis(o,p-dihydroxyphenyl) - 5,5' - bipyrimidyl (3 parts) is heated in boiling acetic anhydride (10 parts) for 30 minutes. The mixture is cooled, added to dilute aqueous $NH_3$ and filtered to yield the desired product which is washed with methanol and dried.

PHOTOSTABILITY EXAMPLES

The examples below illustrate the marked photostability of the present compounds and their suitability as U.V. absorbers to protect light-sensitive substrate materials against degradation by light.

Test media

Since the bipyrimidyls, bipyridyls and phenanthrolines of this invention are normally solid, they are conveniently tested, dissolved or intimately dispersed in a suitable light-transmitting carrier; for example, in solvents such as N,N-dimethylformamide and acetonitrile (representative of polar substrates) or in a film-forming transparent polymer such as a polyacrylonitrile. In general the candidate photostabilizer is incorporated into the carrier in an amount required to impart an optical density (O.D.) in the 1–1.5 range to the final composition:

(A) For light exposure test, solutions were placed in 3 cc. quartz cells having a 1 cm. optical path.

(B) To prepare polyacrylonitrile films the candidate photostabilizer together with one part of particulate commercial film-forming polyacrylonitrile (consisting essentially of a copolymer of 93.6 parts acrylonitrile, 6 parts methyl acrylate and 0.4 part sodium p-styrene sulfonate) and 5 parts of dimethylformamide are heated at about 100° C. for a few minutes to form a clear solution, which is poured on a clean, glass plate and spread with a doctor knife having a 16 mil clearance. The dimethylformamide is evaporated by heating such plate in a vacuum oven (60° C./about 100 mm. Hg pressure) for 2 hours, to give the final film, 1–1.3 mils thick.

Test method

A convenient measure of a compound's photostability is the inverse of the quantum yield ($\phi_R^{-1}$) of its photochemical reactions, either through self-degradation or reaction with its surroundings. Thus, $\phi_R^{-1}$ represents the average number of times a photo-activatable, i.e. light-absorbing molecule, must be photo-activated before it reacts to produce inactive products. In other words (since the number of photo-excited molecules equals the number of quanta absorbed), $\phi_R^{-1}$ is the ratio of the number of quanta absorbed to the number of molecules that have undergone photochemical reaction.

In this method, the photo-stabilizer candidate contained in a suitable substrate as described above is exposed to radiation from a standard Xenon arc lamp such that the radiation first passes through a Corning 0–54 filter to filter out wavelengths below 295 m$\mu$ and through a 10 cm. thick water barrier to remove infrared before it strikes the sample. The extinction coefficient of the test sample's longest wavelength absorption peak and the optical density (O.D) are determined in the usual way using a Cary spectrophotometer.

The number of quanta absorbed is determined with a calibrated 935 photoelectric cell (a series of quartz diffusion discs, disposed along the length of a polished cylinder to diminish directional sensitivity and connected to a microammeter) by measuring the intensities of the radiation that strikes the film surface, $I_o$, and that passes through the film, $I_t$. The current difference, $I_o-I_t$, is directly related to the total quanta absorbed and thus is useful per se for comparing compounds. The actual quanta absorbed per unit substrate volume per unit time is $k(I_o-I_t)$, where $k$ is a constant, $1.74 \times 10^{16}$ quanta/cm.$^2$/hr., determined by calibrating the cell against a uranyl oxalate actinometer according to known techniques.

$I_o$, $I_t$ and O.D. readings at the longest wavelength absorption peak are taken periodically until the optical density has decreased 10–15%, which generally requires from 100 to 1000 hours depending on the composition under test.

The number of molecules photolyzed is determined from the rate at which the optical density decreases with exposure time. This correlation is operative here because the compounds involved degrade to products which are optically inactive in the region of the monitored peak, as indicated by the fact that the peak's optical density decreases linearly with time and its wavelength remains unchanged during the indicated period.

The photostability is calculated as follows:

$$\phi_R^{-1} = 0.0286[(I_o-I_t)\cdot\epsilon]/(\Delta O.D./\Delta t)$$

where $I_o$=the incident light intensity
$I_t$=the transmitted light intensity
$\epsilon$=the extinction coefficient of the photostabilizer
O.D.=log $I_o/I_t$
$\Delta O.D./\Delta t$=how optical density at peak absorption changes with time, or the slope, $a$, of the linear curve, O.D.=$a \cdot t + b$, where $t$ is the time in hours, $b$ the optical density at time zero, and
0.0286=a composite constant including the cell calibration constant described above.

$\phi_R^{-1}$ is an objective measure of the photostability of a compound. It takes into account the decrease in optical density with time, the broadness of the absorption spectrum ($I_o-I_t$), and the intensity of absorption ($\epsilon$). The smaller the decrease in optical density with time, the longer the U.V. screener will last and the longer the protection to the substrate. The broader the absorption band and the higher the extinction coefficient, the smaller is the amount of U.V. screener to provide a given optical density (optical densities of 1–2 correspond to 90–99% absorption).

If equal amounts of two U.V. screeners having roughly equal absorption characteristics (and molecular weights) are added to a substrate and if $\phi_R^{-1}$ of one compound is ten times that of the other, then the first compound will afford protection for a period of time ten times longer.

Examples 11–16

The following table illustrates the photostabilizing qualities of the novel compounds of this invention when incorporated into polyacrylonitrile and acetonitrile-based substrates:

| | | Photostability value | |
|---|---|---|---|
| Example | Photostabilizer | Matrix | $\phi_R^{-1}$ |
| 11 | 3,8-bis(o-hydroxyphenyl)-4,7-phenanthroline. | Polyacrylonitrile | $1.6 \times 10^6$ |
| 12 | do | Dimethylformamide plus acetonitrile (1:8). | $1.2 \times 10^6$ |
| 13 | 2,2'bis(o-hydroxyphenyl)-5,5'-bipyrimidyl. | Polyacrylonitrile | $6.9 \times 10^6$ |
| 14 | do | Dimethylformamide plus acetonitrile (1:12). | $3.1 \times 10^7$ |
| 15 | 6,6'-bis(o-hydroxyphenyl)-3,3'-bipyridyl. | Polyacrylonitrile | $1.3 \times 10^5$ |
| 16 | do | Dimethylformamide plus acetonitrile (3:37). | $3.5 \times 10^5$ |

Example 17

U.V.-screening polyvinylfluoride film: A polyvinylfluoride organosol containing 1% wt. of 2,2'-bis(o-hydroxyphenyl)-5,5'-bipyrimidyl based on the polyvinylfluoride is prepared by the procedure described in U.S. Pat. No. 2,953,818 by mixing the bipyrimidyl with a mixture containing 40% wt. polyvinylfluoride in N,N'-dimethylacetamide. The organosol is cast on a ferrate type plate and briefly heated under infrared radiation to coalesce the composition into a self-supporting partially dried gel film. The gel film is placed in a frame (to prevent relaxation and to induce biaxial orientation during subsequent drying by heating), then heated at 185° C. for 2 to 3 minutes under a high velocity air stream to evaporate the residual dimethylacetamide solvent and provide a clear transparent 1 mil thick film.

Exposed in an Atlas Sunshine Arc Weathero-Meter Model XW-R, wherein the sample is subjected to a complex environment which includes heat, ultraviolet light, visible light and moisture, the film containing the bipyrimidyl exhibits outstanding retention of its ultraviolet light screening properties, and thus is suitable to protect coated surfaces and packaged materials from ultraviolet radiation.

For example, laminar structures for outdoor structural components having high resistance to photodegradation may be prepared by the method described in U.S. Pat. No. 3,265,760 for laminating the films with adhesive polymeric resins, e.g. polyester/fiber glass compositions.

The foregoing detailed description has been given for clearness of understanding only and no unnecessary limitations are to be understood therefrom. The invention is not limited to the exact details shown and described, for obvious modifications will occur to those skilled in the art.

What is claimed is:
1. A compound of the formula

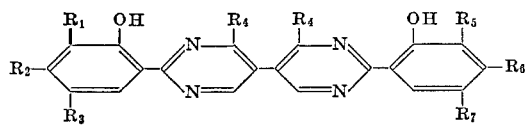

wherein $R_1$, $R_2$, $R_3$, $R_5$, $R_6$ and $R_7$ are separately selected from hydrogen, chlorine, hydroxy, alkyl and alkoxy said alkyl, and alkoxy groups containing up to 18 carbon atoms each; and $R_4$ is hydrogen.

2. Claim 1 wherein $R_1$, $R_2$, $R_3$, $R_5$, $R_6$ and $R_7$ are hydrogen.

3. Claim 1 wherein $R_1$, $R_3$, $R_5$ and $R_7$ are hydrogen, and wherein $R_2$ and $R_6$ are hydroxy.

4. A process for preparing bipyrimidyls which comprises:
(A) condensing
(1) an amidine of the formula

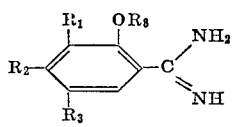

or a mineral acid salt thereof, where $R_1$, $R_2$ and $R_3$ are selected from hydrogen, chlorine, hydroxy, alkyl and alkoxy, said alkyl, and alkoxy containing up to 18 carbon atoms; $R_8$ is selected from hydrogen, methyl, allyl and benzyl, with (2) a tetraformylethane derivative of the formula

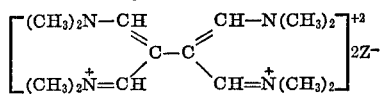

where Z is a salt-forming anion.

(3) at a temperature in the range of 25° to 100° C. in aqueous or alcoholic media for said reactants containing an acid-binding agent in an amount providing at least about one hydrogen ion equivalent of acid-binding agent per molecule of (1) employed taken as the free base; and (B) recovering the resultant bipyrimidyl or bipyridyl from the reaction mass.

5. Claim 4 wherein reactant (1) is in the form of a salt of a mineral acid; reactant (2) is in the form of a perchlorate salt; and agent (4) provides at least two equivalents of base per amidine or salt employed.

6. Claim 5 wherein reactant (1) is an amidinium sulfate where $R_8$ is hydrogen; (3) is ethanol; and (4) is sodium ethoxide.

7. Claim 6 wherein $R_1$, $R_2$ and $R_3$ are hydrogen and 2,2'-bis(o-hydroxyphenyl)-5,5'-bipyrimidyl is recovered from the reaction mass.

References Cited

Caton et al., C. A. 68, 39579Z (1968).

ALEX MAZEL, Primary Examiner

R. V. RUSH, Assistant Examiner

U.S. Cl. X.R.

106—17; 252—300, 403; 260—45.8 N, 287 R, 288 P, 295 R, 297 R

PO-1050
(5/69)

UNITED STATES PATENT OFFICE
CERTIFICATE OF CORRECTION

Patent No. 3,660,404      Dated May 2, 1972

Inventor(s) JAN-ERIC A. OTTERSTEDT and RICHARD PATER

It is certified that error appears in the above-identified patent and that said Letters Patent are hereby corrected as shown below:

Claim 4, Col. 16, Line 13, delete "or bipyridyl".

Signed and sealed this 24th day of October 1972.

(SEAL)
Attest:

EDWARD M. FLETCHER, JR.
Attesting Officer

ROBERT GOTTSCHALK
Commissioner of Patents